United States Patent
Samzelius

(10) Patent No.: US 11,100,201 B2
(45) Date of Patent: *Aug. 24, 2021

(54) METHOD AND SYSTEM FOR AUTHENTICATING A USER THROUGH TYPING CADENCE

(71) Applicant: NeuraMetrix, Inc., Hillsborough, CA (US)

(72) Inventor: Jan Erik Samzelius, Hillsborough, CA (US)

(73) Assignee: NEURAMETRIX, INC., Hillsborough, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/331,595

(22) Filed: Oct. 21, 2016

(65) Prior Publication Data

US 2017/0116399 A1    Apr. 27, 2017

Related U.S. Application Data

(60) Provisional application No. 62/244,502, filed on Oct. 21, 2015, provisional application No. 62/244,504, filed on Oct. 21, 2015.

(51) Int. Cl.
*G06F 21/31* (2013.01)
*H04L 29/06* (2006.01)
*H04W 12/68* (2021.01)

(52) U.S. Cl.
CPC ............ *G06F 21/316* (2013.01); *H04L 63/08* (2013.01); *G06F 2221/2133* (2013.01); *H04L 63/0861* (2013.01); *H04W 12/68* (2021.01)

(58) Field of Classification Search
CPC ........ G06F 21/34; G06F 3/023; G06F 3/0488; G06F 21/316; G06F 21/32; G06F 21/83;
(Continued)

(56) References Cited

U.S. PATENT DOCUMENTS

| 4,805,222 A | 2/1989 | Young et al. |
| 5,557,686 A * | 9/1996 | Brown ................. G06F 21/316 340/5.51 |

(Continued)

FOREIGN PATENT DOCUMENTS

| JP | 2005508211 A | 3/2005 |
| JP | 2006127624 A | 5/2006 |

(Continued)

OTHER PUBLICATIONS

Bajaj, et al., "Typing Speed Analysis of Human for Password Protection (Based on Keystrokes Dynamics)" International Journal of Innovative Technology and Exploring Engineering (IJITEE), ISSN: 2278-3075, vol. 3, Issue-2, Jul. 2013, pp. 88-91. (Year: 2013).*

(Continued)

*Primary Examiner* — Harunur Rashid
(74) *Attorney, Agent, or Firm* — DLA Piper LLP (US)

(57) ABSTRACT

A system and method for authenticating a user are disclosed. The system and method may use particular measurements, with high statistical powers based on keyboard typing and cadence to produce a way of authentication users which is many orders of magnitude better than existing methods.

13 Claims, 3 Drawing Sheets

(58) Field of Classification Search
CPC ............ G06F 21/31; G06F 2221/2101; G06F 11/3476; G06F 2221/2151; G06F 2221/2133; H04L 63/08; H04L 63/0861; H04W 12/68
See application file for complete search history.

(56) References Cited

U.S. PATENT DOCUMENTS

| | | | |
|---|---|---|---|
| 5,885,231 | A | 3/1999 | Cramer et al. |
| 8,099,253 | B1* | 1/2012 | Rau .................... G01M 99/008 400/473 |
| 8,230,232 | B2 | 7/2012 | Ahmed |
| 8,346,680 | B2 | 1/2013 | Castleman et al. |
| 8,533,486 | B1* | 9/2013 | Stark ................... H04L 63/0861 713/186 |
| 8,533,815 | B1* | 9/2013 | Upson ................ H04L 63/0838 726/19 |
| 8,997,191 | B1* | 3/2015 | Stark ....................... G06F 21/32 726/6 |
| 9,329,699 | B2* | 5/2016 | Allen ...................... G06F 3/023 |
| 10,694,987 | B1 | 6/2020 | Samzelius |
| 2002/0192624 | A1 | 12/2002 | Darby et al. |
| 2004/0059950 | A1* | 3/2004 | Bender ................. G06F 21/316 726/5 |
| 2004/0167380 | A1 | 8/2004 | Simon |
| 2006/0195328 | A1 | 8/2006 | Abraham et al. |
| 2007/0234056 | A1* | 10/2007 | Mani ...................... G06F 21/32 713/172 |
| 2008/0091639 | A1 | 4/2008 | Davis et al. |
| 2008/0092209 | A1 | 4/2008 | Davis et al. |
| 2008/0098456 | A1 | 4/2008 | Alward et al. |
| 2009/0002178 | A1 | 1/2009 | Guday et al. |
| 2009/0062686 | A1 | 3/2009 | Hyde et al. |
| 2009/0134972 | A1 | 5/2009 | Wu, Jr. et al. |
| 2012/0098750 | A1 | 4/2012 | Allen et al. |
| 2012/0235819 | A1 | 9/2012 | Watkins et al. |
| 2012/0306758 | A1 | 12/2012 | Marsden et al. |
| 2013/0176413 | A1 | 7/2013 | Lowry et al. |
| 2013/0326604 | A1* | 12/2013 | Hird ........................ G06F 21/32 726/7 |
| 2013/0338541 | A1 | 12/2013 | Metman |
| 2013/0347099 | A1* | 12/2013 | Smith ................... G06F 21/316 726/19 |
| 2014/0058241 | A1 | 2/2014 | Apparies et al. |
| 2015/0169854 | A1* | 6/2015 | Chang ..................... G06F 21/32 340/5.85 |
| 2015/0296023 | A1 | 10/2015 | Rokkaku |
| 2015/0379253 | A1* | 12/2015 | Cook ....................... G09B 5/00 726/19 |
| 2016/0143570 | A1* | 5/2016 | Valacich ................. A61B 5/164 434/362 |
| 2016/0345908 | A1 | 12/2016 | Samzelius |
| 2017/0116399 | A1 | 4/2017 | Samzelius et al. |
| 2017/0116405 | A1 | 4/2017 | Samzelius et al. |

FOREIGN PATENT DOCUMENTS

| | | |
|---|---|---|
| JP | 2009160373 A | 7/2009 |
| JP | 2011004840 A | 1/2011 |
| JP | 2017086678 A | 5/2017 |
| JP | 2018512202 A | 5/2018 |
| WO | WO03015059 A1 | 2/2003 |
| WO | WO2007/078756 | 7/2007 |
| WO | WO2012/128952 | 9/2012 |
| WO | WO2014205420 A2 | 12/2014 |
| WO | WO2016145372 A1 | 9/2016 |

OTHER PUBLICATIONS

Umphress et al., "Identity verification through keyboard characteristics". International Journal of Man-Machine Studies. Jan. 15, 1985, pp. 263-273. (Year: 1985).*

Alsulatn et al., "Non-conventional keystroke dynamics for user authentication" www.elsevier.com/locate/patrec , Sep. 15, 2015 p. 53-59. (Year: 2015).*

Alsolami et al., An examination of keystroke dynamics for continuous user authentication, Doctoral dissertation, Queensland University of Technology; Aug. 2012, eprints.qut.edu.au, pp. 1-8. (Year: 2012).*

Alsolami et al "An examination of keystroke dynamics for continuous user authentication" PhD thesis, Queensland University of Technology.2012, pp. 1-4 (Year: 2012).*

Frid et al., Analysis of Finger Tapping Parameters in People with ADHD, dated 2012; IEEE 27th Convention of Electrical and Electronics Engineers in Israel (4 pgs.).

Banerjee et al.; Biometric Authentication and Identification using keystroke Dynamics: A Survey; Journal of Pattern Recognition Research 7, 116-139 (2012).

H. Barghouthi; Keystroke Dynamics: How typing characteristics differ from one application to another; Masters Thesis: Master of Science in Information Security; Gjovik University College 67 pages (2009).

Clayton Epp et al.; Identifying emotional states using keystroke dynamics; Chi 2011 Session Emotional States 715-724 (2011).

Anil Jain et al.; Biometrics of Next Generation: An Overview: To Appear in Second Generation Biometrics' Springer 2010, 36 pages (2010).

Kevin Killourhy; A Scientific Understanding of Keystroke Dynamics: School of Computer Science Carnegie Mellon University: Thesis Committee: 213 pages (2012).

Kevin S. Killourhy et al. "Comparing Anomaly-Detection Algorithms for Keystroke Dynamics" Dependable Systems Laboratory, Computer Science Department, Carnegie Mellon University, 10 pages (2009).

Ryuhei Okuno et al. Finger Taps Movement Acceleration Measurement System for Quantitative Diagnosis of Parkinson's disease, Conference Proceedings . . . Annual International Conference of the IEEE Engineering in Medicine and Biology Society, 5 pages (Feb. 2006).

Information Security Stack Exchange; Authentication—Is behavioral analysis (e.g. keystroke dynamics) a reliable security mechanism for MFA? 5 pages (2013).

Signature and Keystroke Dynamics; Biometrics—The Hand-Signature and Keystroke Dynamics; 1 page (2013).

Esther Strauss et al. A Compendium of Neuropsychological Tests: Administration, Norms, and Commentary, Third Edition, Oxford University Press 1225 pages (2004).

J.R. Wall et al. "Can Motor Measures Tell us if Someone is trying? An Assessment of Sincerity of Effort in simulated malingering" Abstracts from the 18th Annual Meeting, 2 pages (1998).

Vizer, L. (2009) Detecting cognitive and physical stress through typing behavior. In Proceedings of ACM SIGCHI 2009 Conference on Human Factors in Computing Systems, Boston, MA 3113-3116, Apr. 2009.

Vizer et al. (2011). Detecting Cognitive impairment using keystroke and linguistic features of typed text: Toward an adaptive method for continuous monitoring of cognitive status. In Proceedings of Information Quality in e-Health—USAB 2011, Graz, Austria, Nov. 2011, A. Holzinger and K.M. Simonic Eds. Springer-Verlag, Lecture Notes in Computer Science 7058, 483-5000, 18 pages (2011).

Vizer, L. 2013. "Detecting cognitive impairment using keystroke and linguistic features of typed text. Toward an Adaptive Method for Continuous Monitoring of Cognitive Status",HFES 2013 Symposium on Human Factors and Ergonomics in Health Care: Advancing the Cause, 18 pages, (Mar. 2013).

* cited by examiner

METHOD AND SYSTEM FOR AUTHENTICATING A USER THROUGH TYPING CADENCE

RELATED APPLICATIONS/PRIORITY CLAIMS

This application claims priority under 35 USC 120 and claims the benefit under 35 USC 119(e) of U.S. Provisional Patent Application Ser. No. 62/244,502 filed on Oct. 21, 2015 and entitled "Method And System For Authenticating A User Through Typing Cadence" and U.S. Provisional Patent Application Ser. No. 62/244,504 filed on Oct. 21, 2015 and entitled "System And Method For Authenticating A User Through Unique Aspects Of The User's Keyboard", the entirety of both of which are incorporated herein by reference.

APPENDIX

Appendix A contains an example of a portion of the key action data that may be sent to the authentication component. Specifically, Appendix A contains key event data for a particular user (serial number 1234) and the data may include first key identification data and second key identification data.

FIELD

The disclosure is directed to systems and method for authenticating a user.

BACKGROUND

When any user of a computing device, such as a computer, tablet, or smartphone, accesses an online or networking service, such as banking or a corporate network, either in the office, behind the firewall or remotely, the user will normally go through an AUTHENTICATION procedure, which attempts to verify that the user is who he or she is supposed to be.

Such authentication procedures typically rely on something the user:
1. Knows, like a password or the answer to a secret question
2. Has, such as hardware token or a smartcard
3. Is. Fingerprints and iris scans belong in the category.

Most of these techniques have proven vulnerable to the methods of criminals. As a result, losses to cybercrime in the form of stolen accounts, identities and corporate data are growing rapidly from an already large base.

Thus, it is desirable to provide a way to dramatically improve the effectiveness of authentication, i.e. make it near impossible for criminals to use somebody else's login credentials while being very unobtrusive vis-à-vis the correct user.

DETAILED DESCRIPTION FO ONE OR MORE EMBODIMENTS

The disclosure is particularly applicable to using keyboard typing cadence to authenticate a user for access to a website or web-service and it is in this context that the disclosure will be described. It will be appreciated, however, that the system and method has greater utility, such as to providing authentication for any situation in which it is desirable to have strong authentication mechanisms. Furthermore, the system and method may be implemented with or in any system that has a keyboard (even a virtual keyboard) and used for authentication.

The weakness of all the above known methods of authentication is that the crucial information can, with relative ease, be copied or stolen. Thus, the base of a good authentication method must rely on something which cannot be copied or stolen. Habits meet these criteria—they have to be mimicked or replayed, both of which require considerable work by the criminal. In addition, certain features can be incorporated to significantly increase the difficulty and work effort for the criminal.

Among candidate habits, typing cadence shows the best potential. It is something virtually everybody does, who is a user in the sense stated above. Most of us type a lot every day. Nowadays, the habit begins forming early and, given that very few take formal typing training, there is little correcting mechanism and everyone develops their own way. Neurophysiologists have long known that people's typing cadence is as unique as our signatures.

The system and method involve measuring particular attributes about a user's typing cadence, sending such measures to a component (that may be part of the same computer that has the keyboard or another remote authentication component/system) where those current measures are compared to an already established profile of this user's typing cadence. For example, the measures may include, but are not limited to, the dwell times and flight times. Dwell times refer to the time a particular key is held down, whereas flight times refer to the time between one key is pushed down and the next key is pushed down. These times are typically measured in Milliseconds (Ms) although certain hardware can measure more precisely than that. The authentication component can profile contains statistical measures for each relevant dwell and flight time, which are compared to the recent sample from the user's device. The authentication component may then calculate a probability measure that the user at the keyboard, who is being measured, is the appropriate user. This probability assessment is then used by the relevant online service or to an Identity and Access Management system at the user's employer or any other system involved in giving the user access to the systems requiring authentication or not.

Figure 1:
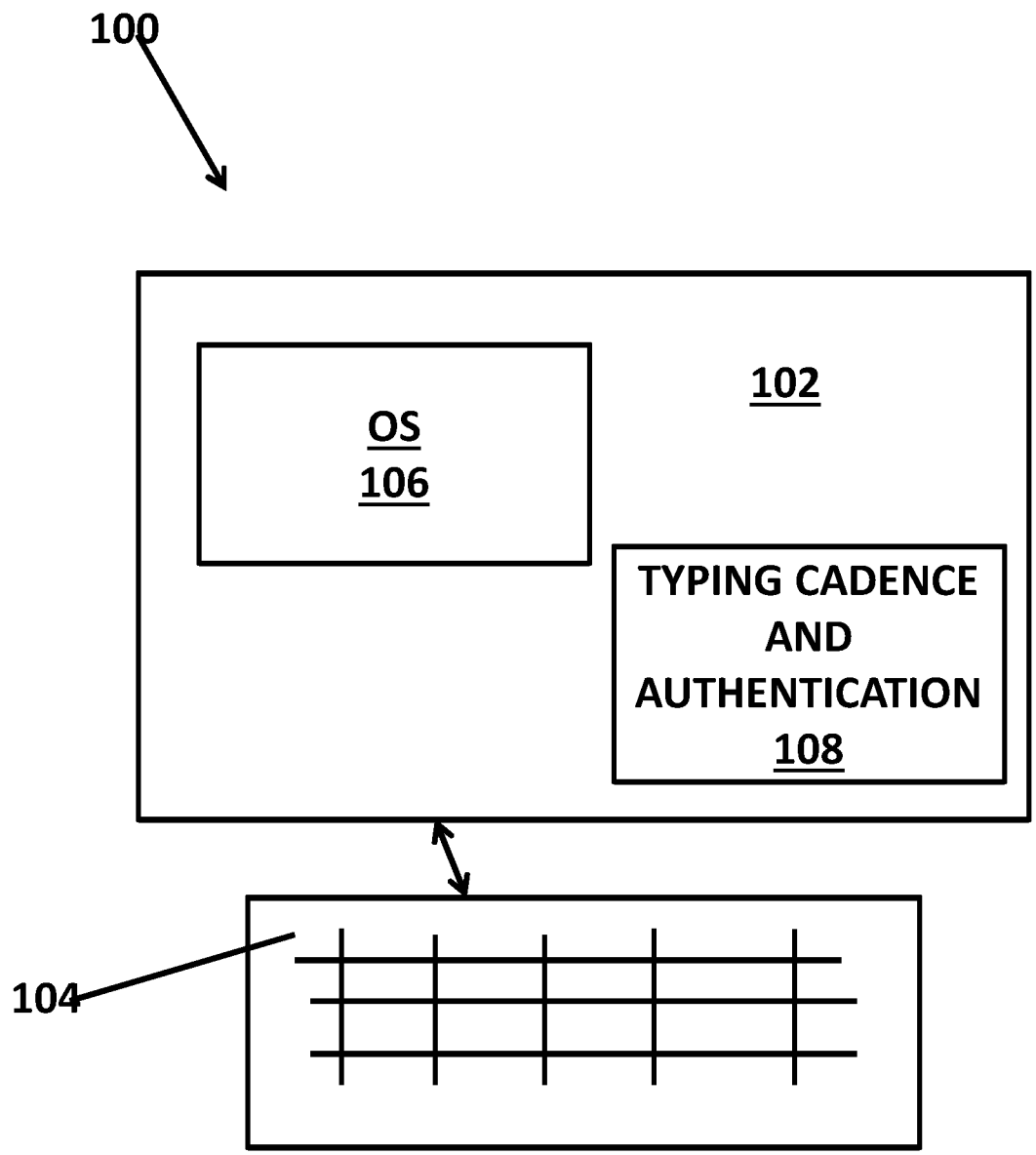
FIG. 1 illustrates an example of an implementation of a keyboard cadence authentication system implemented on a personal computer.

FIG. 1 illustrates an example of an implementation of a keyboard cadence authentication system 100 implemented as a standalone authentication component hosted on the same computing device. The computing device 102 may be a typical processor based device with a display, memory, persistent storage, communication circuits, a keyboard and the like. For example, the computing device may be a smartphone device, such as an Apple iPhone or Android operating system based device, a server computer, a personal computer (such as shown in FIG. 1), a tablet computer, a laptop computer, a terminal device and the like. In accordance with the disclosure, the keyboard cadence authentication system also may be implemented on any system that has a keyboard, such as a security system in a building and the like. The keyboard may be a plurality of keys that a user interfaces with and may thus include a typical computer keyboard (including a physical keyboard, a virtual keyboard or a keyboard that appears on a touchscreen), a keypad with other numbers, symbols or numbers and other symbols (including a physical keypad, a virtual keypad or a keypad that appears on a touchscreen), a keypad or keyboard that is part of a larger system, such as a security system or other access system. For example, the computing device may be a personal computer or laptop computer that has a physical keyboard on which the typing cadence is measured and used to authenticate the user. In another example, the computing device is a processor based device with a touchscreen that displays a keyboard on the touchscreen and the typing cadence of the user typing is measured. In another example, the computing device may be a security system for a residence or building or other area that has an entry keypad or other keypad and the tying cadence of the user on the keypad is measured.

In the implementation shown in FIG. 1, the system 100 has the computing device 102 that hosts and executes an operating system 106 and a typing cadence component and an authentication component 108 shown integrated together in this example. The system also has a keyboard 104 on which a user types and from which typing cadence data is gathered to try to authenticate the user based on the typing cadence. In certain implementations, the typing cadence component may be integrated into a keyboard.

Figure 2:
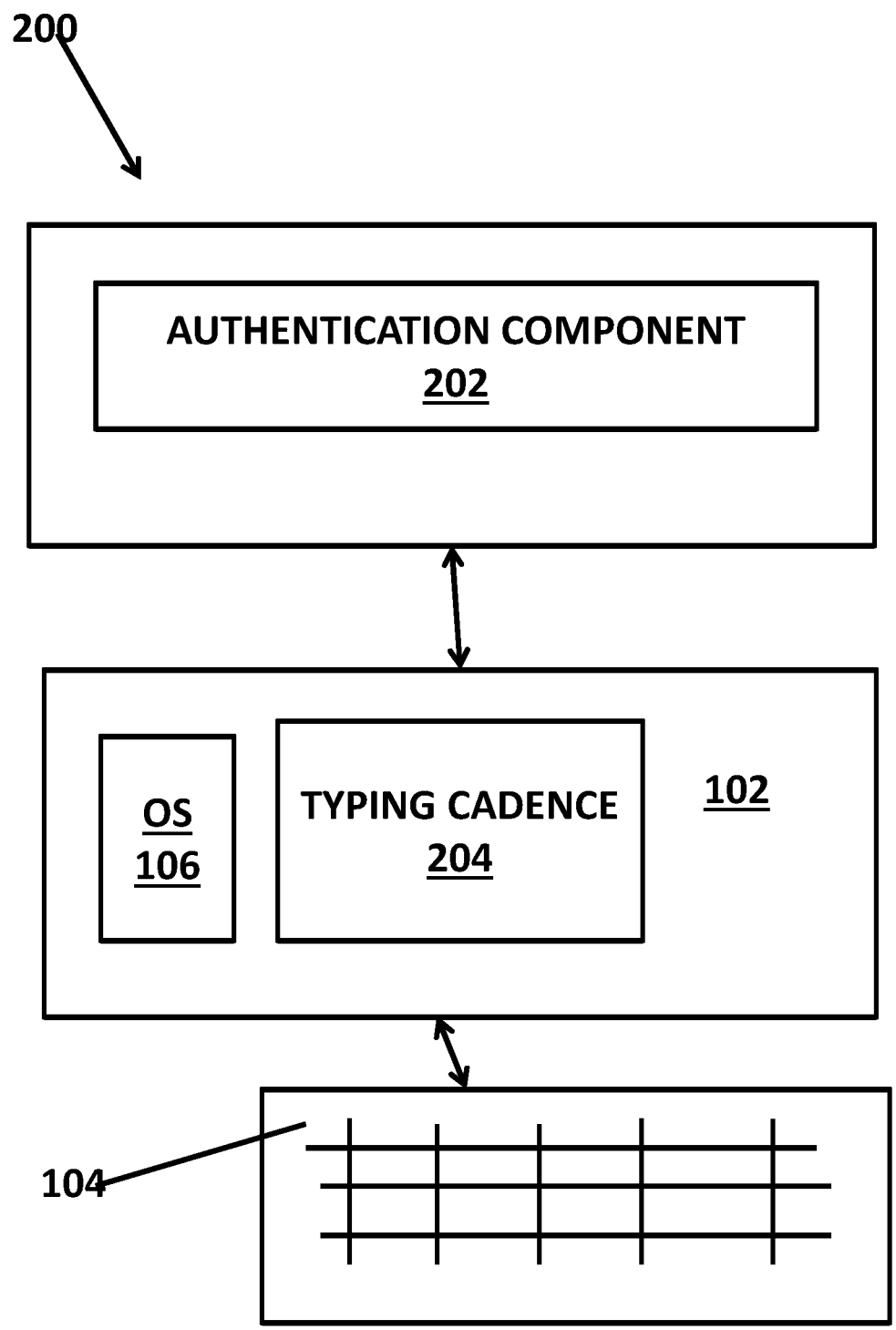
FIG. 2 illustrates an example of an implementation of a keyboard cadence authentication system implemented on a computing device connected to a remote authentication system.

FIG. 2 illustrates an example of an implementation of a keyboard cadence authentication system 200 implemented on a computing device connected to a remote authentication system. The system operates as described above, but a typing cadence client 204 (synonymous with the client described above) is located on the computing device 102 while the authentication component 202 may be located on a remote authentication system that may be hosted on a server computer, cloud computing resources and the like. In both embodiments, the typing cadence client 204 and the authentication component 202 may each be implemented in software or hardware. When each of the components is implemented in software, each component is a plurality of lines of computer code that are executed by a processor of the computing device to implement the functions described above. When each of the components is implemented in hardware, each of the components may be implemented as a microcontroller, a programmable gate array, and the like.

The typing cadence component 204 may be a piece of software or a piece of hardware that is capable of capturing the typing cadence data of the user when the user types of a keyboard. In some embodiments, the typing cadence component 204 may be a plurality of lines of computer code/instructions that capture the keyboard typing cadence data over existing interfaces that may be executed by a processor of the computing device. In some embodiments, the typing cadence component may be a piece of hardware that is capable to capturing the keyboard typing cadence data over existing interfaces or may be a piece of hardware that is capable of capturing the actual keyboard data (key presses and timestamps) using a sensor and then generating the typing cadence data using a processor, a microcontroller, a field programmable gate array and the like. In other embodiments, the typing cadence component may be a combination of hardware and software that either capture the keyboard typing cadence data over existing interfaces or capturing the actual keyboard data (key presses and timestamps) using a sensor and then generate the typing cadence data.

The authentication component 202 may be a piece of software or a piece of hardware that is capable of receiving the typing cadence data, analyzing the typing cadence data and authenticating a user based on that typing cadence data. In some embodiments, the authentication component may be a plurality of lines of computer code/instructions that receives the typing cadence data, analyzes the typing cadence data and authenticates a user based on that typing cadence data may be executed by a processor of the computing device. In some embodiments, the authentication component may be a piece of hardware that is capable of receiving the typing cadence data, analyzing the typing cadence data and authenticating a user based on that typing cadence data or may be a piece of hardware that is capable receiving the typing cadence data, analyzing the typing cadence data and authenticating a user based on that typing cadence data using a processor, a microcontroller, a field programmable gate array and the like. In other embodiments, the authentication component may be a combination of hardware and software that receives the typing cadence data, analyzes the typing cadence data and authenticates a user based on that typing cadence data.

The typing cadence component 204 or the typing cadence and authentication component 108 may be part of a client that may be installed on the computing device. The typing cadence component 204 or the typing cadence and authentication component 108 may perform the following functions:
  a. Collects typing data from the user's computer
  b. Stores collected data in memory
  c. Intermittently, processes the collected data and creates a table of the typing cadence data. For example, the table may contain:
      1. File date
      2. File time
      3. Key pairs (equal if a dwell time)
      4. Any number of actual measures of the particular time
  d. Communicates the collected data/table to the authentication component that may be hosted/co-located on the same computer as the client (see FIG. 1), but may also be sent to an authentication component on a different computer as shown in FIG. 2.

The authentication component (that may be hosted on the same computer as the client (see FIG. 1), but may also on a different computer as shown in FIG. 2), may perform the following functions:
  a. Receives data from the client
  b. Stores collected data in a data storage
  c. When a user is new to the system, the authentication component collects data only until it has enough to build a profile for the particular user
  d. When the profile has been built, the authentication component takes sample typing data received from the client and compares it statistically with the profile and produces the probability assessment. In some embodiments, the sample typing data may be all of the typing that has been performed by the user.

Typing Cadence Component and Protocol

A detailed description of the client/typing cadence component and the structure of the data collected and the communication between the client and the server is contained in non-provisional patent application Ser. No. 14/318,477, which is hereby incorporated by reference. The typing cadence component may hook into the operating system of the computing device and tap into the data stream from the keyboard/input device and gathers the clock time data for each key action/event. Each key action/event may be a the pressing of a key (key press) or a releasing of the key (a key release.) The typing cadence component can store this key event data on a persistent storage device of the computing device, such as a hard drive, flash memory, etc., but to greatly enhance security, the preferred embodiment is to store the key event data temporarily in RAM of the computing device. The typing cadence component may intermittently process the data, calculate all the differential timings used later in the process and packages a file it sends to the authentication component. When the differential timings are calculated, as a security measure in some embodiments, the original clock stamps are removed—thus, the order of the characters is removed, making it impossible to put the data back to the original text.

An example of the key action data stream sent to the authentication component is contained in Appendix A that is incorporated herein by reference. Appendix A contains an example of a portion of the key action data stream for a particular user (serial number 1234.) As shown in the Appendix, the data may include first key identification data and second key identification data. Thus, for example "8" represents a particular key being pressed or released while "76" represents another key being pressed or released by the user. In one embodiment, the value for each key that identifies the key may be the well-known ASCII value for the particular key. The data also has one or more time samples (TS1, TS2, . . . , TS10, etc.) that each happen during a time interval when and after the key combination action occurs. In one embodiment, each time sample may be measured in milliseconds. Each row in the data (other than the header row) represents a particular combination of first and second key actions and then time samples relevant to that particular combination of first and second key actions. When a particular row does not contain values for each sample period, the particular combination of first and second key actions has ended and no further key action data about that particular combination of first and second keys is available. In the key action data in Appendix A, when the first and second key identifier are the same (such as in the first row), then the key action data represents a dwell time for the particular key (such as the key represented by the value "8") which is a time between a key press of the key and a release of the key by the user. As shown in the portion of the data, there are many different time samples for the dwell time for the key. In the key action data in Appendix A, when the first and second key identifier are different (such as "20" and "8" in the second row), then the key action data represents a flight time between a key press of the first key and a key press of the second key. As shown in the portion of the data, there are often fewer time samples for the flight time between the keys. The system may also detect a key event that is a key being pushed down or released by the user. Thus, a dwell time may be determined. The dwell time is a time period between when a given key is being pushed down (pressed by the user) and that same key is released by the user. Thus, the system and method may detect and use both flight time and dwell time. Thus, the typical cadence data from each computing device (and hence each user who uses that computing device) is captured and processed.

In operation, the authentication component 106 may act as an organizer and may unpack the data file for each computing device, may determine to which user the particular computing device relates based on the file header of the particular data file, may convert the data from the format it was sent in into a common format, may calculate the profile data for the particular patient and may place the data and profile in the right folder in the data storage.

Authentication Process

Using the system, the user can be authenticated at log in, on an ongoing basis during use of the computer or both:

1. At log in: the user would be prompted to type a limited amount of text, prompted by the system. Our research indicates that about 20 characters of typing would suffice to identify the user with high probability. This method can also be used when special circumstances warrant an extra level of security, such as when a banking customer wants to add a new payee.
2. The client software on the user's machine records typing cadence on an ongoing basis and sends data to the server with a pre-determined frequency. Every time data is sent, the server calculates the probability that the data is coming from the correct user.

Several crucial features make this authentication system far superior in statistical and security performance, as well as user friendliness to any existing method:

1. Typing data is recorded on an ongoing basis and sent to the authentication component at regular intervals for comparison against the user's profile. Thus, the authentication in this system is continuous, not one single or many disparate events.
2. The client employs the standard high-resolution method for recording the clock time of a particular key event. Such collection (called 'native') is far superior to collection of data at a web site, where the precision of the data can be compromised in many ways
3. When the client processes the recorded data, it calculates the elapsed time between key events and stores these elapsed times in a table. Thus, the actual clock time is not sent to the server, and the sequence of the typing has been eliminated. This insures that the data can never be reassembled into the original text, thereby protecting the privacy of the user.
4. The client records the events of pushing a key down and subsequently releasing it. The client calculates the elapsed times between key down and key up for a particular key and the elapsed times between a key down for one key and the next key down for another key. These calculations are done for each key and for each possible key pair. This process is followed for all typing—thus the method measures natural behavior (except at login, where the typing is prompted), limiting the inconvenience for the user. In addition, natural behavior produces statistically stronger results, since the typing is not impaired by unnatural tasks.
5. The client processes the raw key event data and constructs a table with all possible keys and key pairs going down the left column and the remaining columns are filled with the actual elapsed times measured. A user can see this data table, in order to be assured that it cannot be reconstructed into the original text.
6. The fact that the user is aware that the tying cadence is being recorded should not impact the quality of the typing data—numerous studies have shown that this habit is so strong that it cannot be consciously manipulated or altered.
7. These particular measures are incredibly powerful statistically. Current analysis indicates that the accuracy is many orders of magnitude better than existing authentication methods. As typically measured, this method produces 0% false positives and 0% false negatives.
8. The client encrypts the processed data table and sends it to the server. No data is ever stored on the user's device, because that would create a vulnerability vis-à-vis the cybercriminals.
9. The authentication component provides the client the encryption key on demand.
10. The authentication component can tell the client to produce and send a data file and start a new recording session.
11. The authentication component sends data to the client regarding the amount of typing the next sample should contain.
12. The authentication component may send to the client particular requirements for sample regarding particular letters.
13. The authentication component may also request confirmation from the client that very recent sample contains a particular set of letters.
14. The authentication component communicates with our customer's system, be the customer an online service or a company network, in two ways:
   a. The authentication component provides the probability assessments on an ongoing basis
   b. The authentication component responds to queries regarding a particular user.

Figure 3:
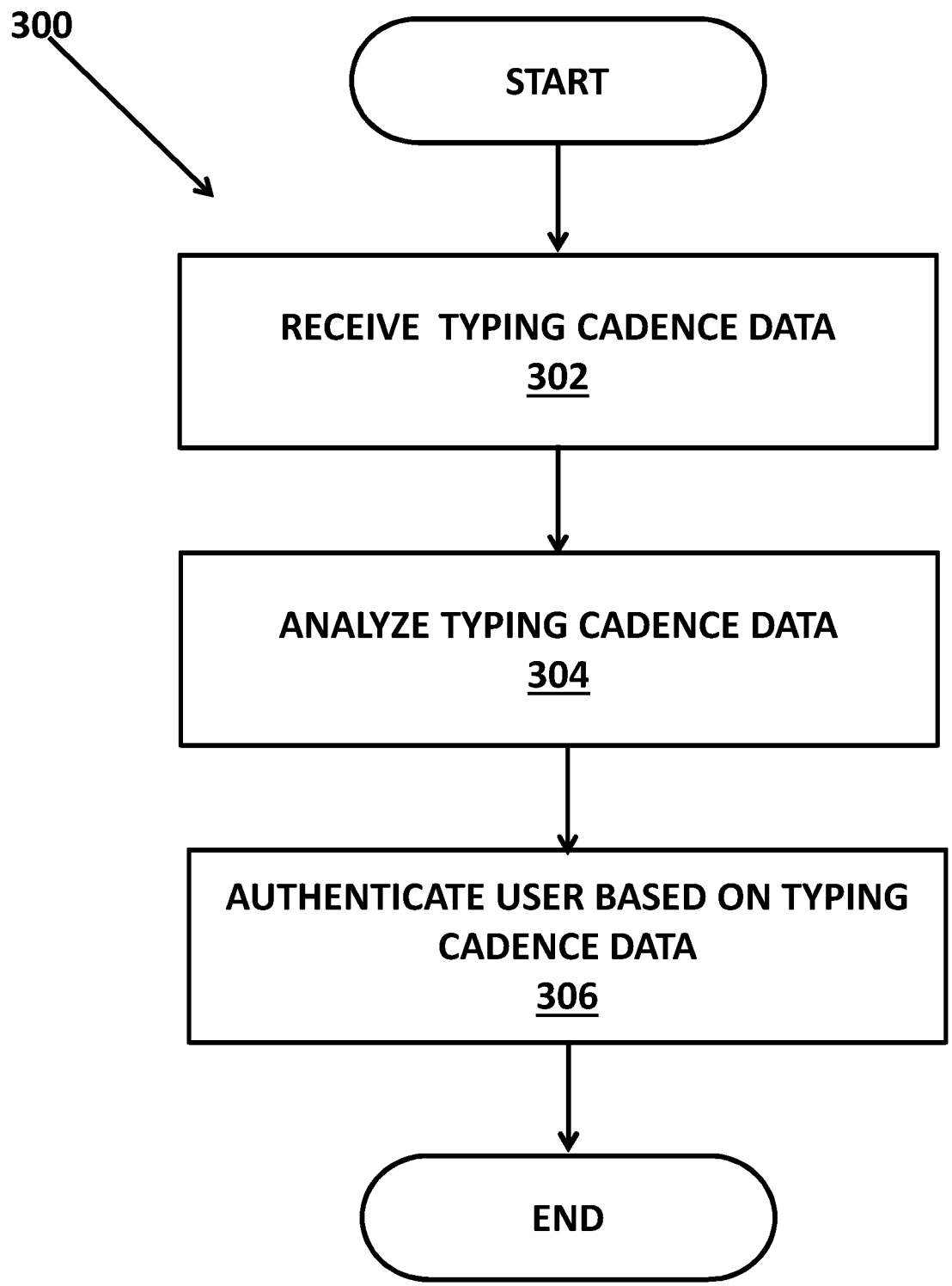
FIG. 3 illustrates a method for authenticating a user using typing cadence data.

FIG. 3 illustrates a method 300 for authenticating a user using typing cadence data. The method may be performed/implemented by the typing cadence component as well as the authentication component that may be part of the same computer system as shown in FIG. 1, but may also be remote from each other as shown in FIG. 2. When the authentication method begins, the authentication component has already received and stored typing cadence data for a particular user. The particular user is a known user who can gain access to the system once that particular user is authenticated.

When an authentication request is made for the particular user, a predetermined amount of current typing cadence data for the particular user may be received (302) and may be captured by the typing cadence component. The typing cadence data may include a plurality of pieces of key event data, each piece of key event data comprising an elapsed time between when a key is pressed and the same key is released during typing and an elapsed time between when a first key is pressed and a second different key is pressed during typing. The typing cadence data may be communicated from the typing cadence component to the authentication component.

When the current typing cadence data is received by the authentication component, the typing cadence data may be analyzed (304) by the authentication component. The authentication component may compare the stored typing cadence data for the particular user to the current typing cadence data for the particular user to calculate a probability that the current typing cadence data for the particular user is similar to the stored typing cadence data and thus the particular user associated with the current typing cadence data is authenticated as being the same as the particular user of the stored typing cadence data that means that the identity of the particular user is authenticated. In one embodiment, the authentication component may use a well-known statistical t-test that calculates the probability that a new value (in the current typing cadence data) is a part of an existing distribution (in the stored typing cadence data) for each variable (for example, each key event) measured. Since these variables are independent of one another, the statistical power is very high and thus provides a high level of confidence that the particular user being authenticated is or is not the particular user of the system associated with the stored typing cadence data. The method may then, based on the analysis of the typing cadence data, determine whether or not to authenticate the user (306). Thus, the disclosed authentication system and method provides a technical solution (authentication of a user based on typing cadence data that is more secure than typical authentication systems and methods) to the technical problem of insecure authentication processes.

The method here described for authentication is very challenging for criminals. The log in could be vulnerable to so called replay attacks, where the criminal already has penetrated the user's device and records typing cadence data in a fashion similar to the one described here. However, the criminal cannot not know what the authentication component will ask him to type and, once the server makes the request, will have very limited time to assemble a response.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such system may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above described authentication system and method addresses a technical problem with most typical authentication systems that the typical authentication systems can be outsmarted by a nefarious person. For example, an authentication system using passwords can be overcome by a nefarious person who discovers the password of the user or uses a brute force approach to discover the password. The above described authentication system and method addresses this technical problem by providing a technical solution that is a more secure authentication system and method. Specifically, the above described authentication system and method provides the security because the authentication method and system uses typing cadence data as a type of biometric data that may be used to authenticate the user and authenticates the user (using a authentication component). The authentication using the typing cadence data is the technical solution to the above technical problem of insecure user authentication methods and systems.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

APPENDIX A

Entries 395
Serial 1234

| First Key Press | Second Key Press | TS1 | TS2 | TS3 | TS4 | TS5 | TS6 | TS7 | TS8 | TS9 | TS10 |
|---|---|---|---|---|---|---|---|---|---|---|---|
| 8 | 8 | 104 | 80 | 104 | 104 | 120 | 176 | 120 | 104 | 144 | 72 |
| 32 | 8 | 5632 | 10079 | | | | | | | | |
| 69 | 8 | 1560 | | | | | | | | | |
| 79 | 8 | 3368 | 9471 | | | | | | | | |
| 83 | 8 | 5232 | 3279 | | | | | | | | |
| 84 | 8 | 1288 | | | | | | | | | |
| 87 | 8 | 2320 | | | | | | | | | |
| 89 | 8 | 2296 | | | | | | | | | |
| 187 | 8 | 1448 | | | | | | | | | |
| 13 | 13 | 112 | 88 | 80 | 128 | 88 | 120 | 97 | 112 | 96 | 144 |
| 32 | 13 | 5943 | | | | | | | | | |
| 78 | 13 | 4408 | | | | | | | | | |
| 83 | 13 | 3416 | | | | | | | | | |
| 190 | 13 | 1960 | 936 | 1280 | 22431 | 4415 | 17024 | | | | |
| 191 | 13 | 15288 | | | | | | | | | |
| 32 | 32 | 96 | 96 | 88 | 80 | 96 | 96 | 96 | 88 | 71 | 72 |
| 54 | 32 | 1280 | | | | | | | | | |
| 65 | 32 | 2327 | 168 | 160 | 160 | 232 | 145 | 192 | | | |
| 66 | 32 | 216 | | | | | | | | | |
| 67 | 32 | 2568 | 6007 | | | | | | | | |
| 68 | 32 | 488 | 240 | 3176 | 144 | 144 | 3008 | 88 | 3645 | 1232 | 112 |
| 69 | 32 | 160 | 328 | 240 | 224 | 216 | 1400 | 1528 | 712 | 152 | 176 |
| 70 | 32 | 936 | 168 | 160 | 160 | 176 | 144 | 1312 | 152 | 216 | 136 |
| 71 | 32 | 416 | 240 | 257 | 936 | 3328 | 368 | 1536 | 2328 | 10943 | 296 |
| 72 | 32 | 256 | 224 | 264 | 296 | 1104 | 1488 | | | | |
| 75 | 32 | 1776 | 2335 | 1552 | | | | | | | |
| 76 | 32 | 2431 | 3424 | 1128 | 400 | 2488 | 488 | 1160 | 1303 | | |
| 77 | 32 | 280 | 1344 | 2616 | | | | | | | |
| 78 | 32 | 192 | 192 | 1767 | 215 | 216 | 496 | 248 | 216 | 296 | 416 |
| 79 | 32 | 272 | 321 | 320 | 264 | 312 | 288 | 928 | 5192 | 288 | 256 |
| 80 | 32 | 4816 | 496 | | | | | | | | |
| 82 | 32 | 1096 | 135 | 120 | 304 | 424 | 208 | 4943 | 184 | 126 | 232 |
| 83 | 32 | 312 | 192 | 2544 | 2440 | 1320 | 3976 | 2160 | 192 | 2344 | 1600 |
| 84 | 32 | 360 | 296 | 1296 | 464 | 416 | 280 | 296 | 280 | 304 | 264 |
| 85 | 32 | 248 | | | | | | | | | |
| 87 | 32 | 1640 | 192 | 2376 | 7895 | 400 | | | | | |
| 89 | 32 | 4264 | 856 | 720 | 2791 | 2343 | 256 | 280 | 280 | 1632 | 352 |
| 186 | 32 | 608 | 480 | | | | | | | | |
| 188 | 32 | 256 | 272 | 256 | 192 | 264 | 240 | 208 | 208 | 256 | 240 |
| 189 | 32 | 976 | 976 | | | | | | | | |
| 190 | 32 | 1440 | 256 | 256 | 264 | 1472 | 240 | 408 | 568 | 264 | 272 |
| 37 | 37 | 104 | 80 | 96 | 128 | 104 | 136 | | | | |
| 77 | 37 | 1856 | | | | | | | | | |
| 48 | 48 | 96 | 120 | | | | | | | | |
| 57 | 48 | 1160 | | | | | | | | | |
| 186 | 48 | 328 | | | | | | | | | |
| 32 | 49 | 2799 | | | | | | | | | |
| 49 | 49 | 191 | 129 | 120 | | | | | | | |
| 186 | 49 | 1695 | | | | | | | | | |
| 32 | 50 | 592 | 824 | | | | | | | | |
| 48 | 50 | 424 | | | | | | | | | |
| 50 | 50 | 88 | 120 | 96 | | | | | | | |
| 49 | 54 | 273 | | | | | | | | | |
| 50 | 54 | 320 | | | | | | | | | |
| 54 | 54 | 96 | 96 | | | | | | | | |
| 49 | 57 | 592 | | | | | | | | | |
| 57 | 57 | 73 | 119 | | | | | | | | |

APPENDIX A-continued

Entries 395
Serial 1234

| First Key Press | Second Key Press | TS1 | TS2 | TS3 | TS4 | TS5 | TS6 | TS7 | TS8 | TS9 | TS10 |
|---|---|---|---|---|---|---|---|---|---|---|---|
| 32 | 65 | 7615 | 200 | 584 | 840 | 216 | 832 | 896 | 208 | 208 | 2135 |
| 65 | 65 | 88 | 128 | 119 | 120 | 184 | 136 | 168 | 96 | 136 | 168 |
| 66 | 65 | 216 | | | | | | | | | |
| 67 | 65 | 216 | 216 | 512 | 392 | 608 | 416 | 464 | 431 | | |
| 68 | 65 | 408 | 344 | | | | | | | | |
| 69 | 65 | 216 | 288 | 368 | 328 | 616 | 296 | 352 | 424 | 344 | 336 |
| 70 | 65 | 232 | 288 | | | | | | | | |
| 71 | 65 | 368 | 359 | | | | | | | | |
| 72 | 65 | 424 | 288 | 480 | 304 | 584 | 424 | 240 | 168 | 400 | 368 |
| 73 | 65 | 488 | | | | | | | | | |
| 75 | 65 | 256 | | | | | | | | | |
| 76 | 65 | 160 | 601 | 631 | 288 | 513 | | | | | |
| 77 | 65 | 368 | 423 | 216 | 976 | 352 | 256 | 464 | 336 | 392 | |
| 78 | 65 | 464 | 464 | | | | | | | | |
| 79 | 65 | 936 | | | | | | | | | |
| 80 | 65 | 632 | 464 | 432 | | | | | | | |
| 82 | 65 | 216 | 856 | 560 | 600 | 344 | 360 | 792 | | | |
| 84 | 65 | 248 | 296 | 288 | | | | | | | |
| 86 | 65 | 424 | 416 | 416 | 400 | 568 | | | | | |
| 87 | 65 | 280 | 320 | 432 | 360 | 256 | | | | | |
| 32 | 66 | 976 | 264 | 215 | 312 | 256 | 1112 | 264 | 208 | 1184 | 264 |
| 65 | 66 | 160 | 192 | | | | | | | | |
| 66 | 66 | 120 | 80 | 72 | 80 | 96 | 72 | 64 | 96 | 88 | 96 |
| 69 | 66 | 704 | | | | | | | | | |
| 73 | 66 | 280 | | | | | | | | | |
| 79 | 66 | 352 | | | | | | | | | |
| 85 | 66 | 288 | | | | | | | | | |
| 160 | 66 | 192 | 168 | 159 | | | | | | | |
| 32 | 67 | 240 | 1568 | 240 | 288 | 351 | 424 | 472 | 4816 | 840 | 496 |
| 65 | 67 | 216 | 192 | 448 | | | | | | | |
| 67 | 67 | 72 | 120 | 144 | 144 | 96 | 96 | 72 | 104 | 137 | 160 |
| 69 | 67 | 304 | 304 | 328 | | | | | | | |
| 73 | 67 | 216 | 392 | 265 | 327 | 352 | | | | | |
| 78 | 67 | 248 | 232 | 216 | 216 | 232 | | | | | |
| 82 | 67 | 304 | 216 | | | | | | | | |
| 83 | 67 | 2304 | 352 | 272 | 288 | 280 | 312 | | | | |
| 85 | 67 | 288 | 304 | 256 | 256 | 256 | | | | | |
| 160 | 67 | 352 | 208 | | | | | | | | |
| 189 | 67 | 376 | | | | | | | | | |
| 32 | 68 | 1191 | 1344 | 376 | 68029 | 1096 | | | | | |
| 65 | 68 | 136 | 344 | | | | | | | | |
| 68 | 68 | 120 | 96 | 104 | 88 | 120 | 112 | 120 | 120 | 88 | 96 |
| 69 | 68 | 336 | 256 | 322 | 328 | 272 | 312 | 320 | 280 | | |
| 73 | 68 | 384 | 256 | 240 | 256 | 168 | | | | | |
| 76 | 68 | 200 | 424 | | | | | | | | |
| 78 | 68 | 360 | 232 | 272 | 256 | 232 | 264 | 256 | 280 | 280 | 280 |
| 79 | 68 | 304 | 392 | 336 | 304 | 352 | | | | | |
| 82 | 68 | 232 | 240 | 288 | | | | | | | |
| 32 | 69 | 232 | 1888 | 496 | 281 | 864 | 216 | 368 | 488 | 232 | 424 |
| 66 | 69 | 240 | 232 | 264 | 359 | 232 | 328 | 280 | 240 | 232 | |
| 67 | 69 | 304 | 368 | 272 | 448 | 304 | 352 | 407 | 456 | 312 | |
| 68 | 69 | 240 | 240 | 256 | 216 | 200 | 192 | 232 | 240 | 231 | 216 |
| 69 | 69 | 96 | 160 | 96 | 104 | 80 | 120 | 144 | 144 | 168 | 80 |
| 70 | 69 | 392 | 520 | | | | | | | | |
| 71 | 69 | 280 | 312 | 368 | 752 | | | | | | |
| 72 | 69 | 304 | 312 | 320 | 384 | 392 | 856 | 384 | 272 | 208 | 424 |
| 73 | 69 | 496 | 279 | 2240 | 232 | 184 | 408 | 288 | 248 | 246 | 264 |
| 75 | 69 | 344 | 216 | 400 | 192 | 240 | 216 | 288 | | | |
| 76 | 69 | 344 | 656 | 256 | 344 | 904 | 232 | | | | |
| 77 | 69 | 440 | 256 | 264 | 256 | 240 | 184 | 848 | 216 | 368 | 1520 |
| 78 | 69 | 256 | 560 | 416 | 160 | 336 | 416 | 424 | 336 | 344 | 328 |
| 80 | 69 | 248 | 216 | 208 | 280 | 432 | | | | | |
| 82 | 69 | 239 | 224 | 240 | 256 | 224 | 312 | 216 | 232 | 215 | 191 |
| 83 | 69 | 208 | 240 | 280 | 256 | 232 | 264 | 264 | 289 | 256 | 240 |
| 84 | 69 | 192 | 384 | 280 | 328 | 264 | 232 | 264 | | | |
| 86 | 69 | 160 | 280 | 200 | 208 | 240 | 184 | 232 | 376 | 288 | 272 |
| 87 | 69 | 200 | 352 | 264 | 232 | 241 | 399 | | | | |
| 89 | 69 | 368 | 240 | 288 | 376 | 345 | | | | | |
| 160 | 69 | 232 | 216 | | | | | | | | |
| 32 | 70 | 384 | 1760 | 233 | 2064 | 400 | 1456 | 360 | 1816 | 232 | 352 |
| 65 | 70 | 240 | | | | | | | | | |
| 68 | 70 | 288 | | | | | | | | | |
| 69 | 70 | 432 | 1680 | | | | | | | | |
| 70 | 70 | 96 | 64 | 136 | 112 | 88 | 96 | 88 | 95 | 112 | 96 |

APPENDIX A-continued

Entries 395
Serial 1234

| First Key Press | Second Key Press | TS1 | TS2 | TS3 | TS4 | TS5 | TS6 | TS7 | TS8 | TS9 | TS10 |
|---|---|---|---|---|---|---|---|---|---|---|---|
| 73 | 70 | 344 | 272 | | | | | | | | |
| 79 | 70 | 336 | 304 | 424 | 304 | 288 | 256 | 328 | 328 | 376 | 368 |
| 160 | 70 | 256 | 216 | | | | | | | | |
| 32 | 71 | 312 | 592 | 305 | 328 | 351 | | | | | |
| 65 | 71 | 192 | 192 | | | | | | | | |
| 71 | 71 | 88 | 88 | 88 | 72 | 96 | 96 | 96 | 80 | 88 | 112 |
| 73 | 71 | 400 | 304 | 360 | 312 | 376 | | | | | |
| 78 | 71 | 280 | 336 | 264 | 272 | 304 | 312 | 255 | 360 | 384 | 312 |
| 79 | 71 | 384 | | | | | | | | | |
| 32 | 72 | 304 | 1016 | 976 | 5680 | 328 | 360 | 680 | 1472 | 304 | 280 |
| 67 | 72 | 192 | 192 | 312 | 344 | 448 | 551 | 256 | 232 | 208 | 168 |
| 71 | 72 | 240 | | | | | | | | | |
| 72 | 72 | 96 | 104 | 88 | 96 | 112 | 64 | 96 | 120 | 72 | 80 |
| 83 | 72 | 168 | 192 | 216 | | | | | | | |
| 84 | 72 | 264 | 248 | 288 | 216 | 160 | 184 | 200 | 304 | 192 | 272 |
| 87 | 72 | 256 | 607 | 384 | 200 | | | | | | |
| 8 | 73 | 2815 | 408 | | | | | | | | |
| 32 | 73 | 464 | 312 | 304 | 1112 | 504 | 296 | 376 | 360 | 3136 | 312 |
| 65 | 73 | 312 | | | | | | | | | |
| 66 | 73 | 744 | 296 | | | | | | | | |
| 67 | 73 | 264 | 264 | 208 | 224 | 280 | | | | | |
| 68 | 73 | 303 | 392 | 264 | 280 | 240 | | | | | |
| 69 | 73 | 264 | 208 | 344 | | | | | | | |
| 70 | 73 | 400 | 176 | 248 | 256 | 320 | | | | | |
| 71 | 73 | 472 | 552 | 4792 | | | | | | | |
| 72 | 73 | 544 | 432 | 488 | 608 | | | | | | |
| 73 | 73 | 88 | 88 | 72 | 72 | 80 | 72 | 88 | 96 | 88 | 64 |
| 75 | 73 | 232 | 304 | 248 | | | | | | | |
| 76 | 73 | 312 | 296 | 240 | 328 | 312 | 296 | 584 | | | |
| 78 | 73 | 296 | 368 | 519 | | | | | | | |
| 79 | 73 | 216 | | | | | | | | | |
| 80 | 73 | 288 | 247 | 311 | | | | | | | |
| 82 | 73 | 216 | 432 | 240 | 728 | 376 | 240 | 240 | 256 | 200 | 304 |
| 83 | 73 | 408 | 312 | 497 | 304 | 217 | 305 | 216 | 344 | | |
| 84 | 73 | 528 | 560 | 544 | 552 | 496 | 264 | 536 | 312 | 136 | 632 |
| 85 | 73 | 536 | 417 | 232 | | | | | | | |
| 86 | 73 | 512 | | | | | | | | | |
| 87 | 73 | 672 | 639 | 288 | 271 | | | | | | |
| 160 | 73 | 544 | 352 | 328 | 256 | 344 | 304 | | | | |
| 74 | 74 | 88 | | | | | | | | | |
| 160 | 74 | 208 | | | | | | | | | |
| 32 | 75 | 1120 | 1992 | | | | | | | | |
| 65 | 75 | 248 | 184 | 384 | 352 | 280 | 240 | | | | |
| 67 | 75 | 264 | 424 | 327 | | | | | | | |
| 69 | 75 | 281 | | | | | | | | | |
| 75 | 75 | 95 | 112 | 80 | 72 | 72 | 104 | 96 | 88 | 96 | 88 |
| 78 | 75 | 472 | | | | | | | | | |
| 82 | 75 | 240 | | | | | | | | | |
| 83 | 75 | 256 | 280 | 230 | 184 | 265 | | | | | |
| 32 | 76 | 320 | 512 | 584 | 752 | 544 | 600 | 2608 | | | |
| 65 | 76 | 536 | 448 | 264 | 303 | 232 | 408 | | | | |
| 66 | 76 | 512 | 616 | 728 | 400 | | | | | | |
| 69 | 76 | 352 | 328 | 344 | 360 | 232 | 625 | 904 | | | |
| 71 | 76 | 648 | | | | | | | | | |
| 73 | 76 | 360 | 304 | 280 | 486 | 344 | 280 | | | | |
| 75 | 76 | 192 | | | | | | | | | |
| 76 | 76 | 96 | 96 | 96 | 96 | 96 | 104 | 72 | 96 | 96 | 104 |
| 78 | 76 | 488 | | | | | | | | | |
| 79 | 76 | 240 | 216 | 256 | 240 | | | | | | |
| 80 | 76 | 224 | 247 | | | | | | | | |
| 82 | 76 | 152 | 600 | 608 | | | | | | | |
| 83 | 76 | 240 | | | | | | | | | |
| 84 | 76 | 680 | | | | | | | | | |
| 85 | 76 | 903 | 560 | 440 | 528 | | | | | | |
| 32 | 77 | 256 | 344 | 2376 | 304 | 1360 | 232 | 560 | 1696 | 984 | 1480 |
| 65 | 77 | 264 | 288 | 216 | 304 | | | | | | |
| 69 | 77 | 952 | 376 | 264 | 464 | | | | | | |
| 73 | 77 | 296 | | | | | | | | | |
| 77 | 77 | 112 | 120 | 136 | 112 | 71 | 96 | 104 | 88 | 48 | 72 |
| 78 | 77 | 1352 | | | | | | | | | |
| 79 | 77 | 400 | 280 | 288 | 312 | 304 | 280 | 328 | | | |
| 80 | 77 | 880 | 496 | | | | | | | | |
| 84 | 77 | 1912 | 464 | 472 | 760 | | | | | | |
| 85 | 77 | 320 | | | | | | | | | |

APPENDIX A-continued

Entries 395
Serial 1234

| First Key Press | Second Key Press | TS1 | TS2 | TS3 | TS4 | TS5 | TS6 | TS7 | TS8 | TS9 | TS10 |
|---|---|---|---|---|---|---|---|---|---|---|---|
| 160 | 77 | 608 | 192 | 232 | 376 | | | | | | |
| 8 | 78 | 2592 | | | | | | | | | |
| 32 | 78 | 232 | 248 | 1536 | 256 | 911 | 296 | 904 | 6047 | 1344 | 2440 |
| 65 | 78 | 208 | 280 | 568 | 184 | 264 | 264 | 224 | 296 | 144 | 264 |
| 69 | 78 | 176 | 313 | 352 | 408 | 208 | 256 | 144 | 256 | 184 | 184 |
| 71 | 78 | 280 | | | | | | | | | |
| 72 | 78 | 264 | | | | | | | | | |
| 73 | 78 | 280 | 296 | 328 | 344 | 304 | 288 | 288 | 304 | 248 | 272 |
| 75 | 78 | 5880 | | | | | | | | | |
| 78 | 78 | 96 | 96 | 96 | 72 | 96 | 88 | 96 | 64 | 64 | 48 |
| 79 | 78 | 400 | 296 | 320 | 288 | 304 | 328 | 328 | 328 | 336 | 328 |
| 82 | 78 | 96 | 256 | 304 | | | | | | | |
| 83 | 78 | 152 | | | | | | | | | |
| 85 | 78 | 367 | 249 | 288 | 304 | 240 | 256 | 264 | 280 | 304 | 344 |
| 87 | 78 | 1072 | 240 | | | | | | | | |
| 8 | 79 | 496 | | | | | | | | | |
| 32 | 79 | 552 | 1840 | 408 | 2599 | 680 | 424 | 368 | 752 | 8295 | 352 |
| 67 | 79 | 216 | 512 | 272 | 464 | 256 | 368 | 296 | 280 | 216 | 256 |
| 68 | 79 | 512 | | | | | | | | | |
| 69 | 79 | 4408 | | | | | | | | | |
| 70 | 79 | 535 | 280 | 264 | 568 | 272 | 264 | 280 | | | |
| 71 | 79 | 624 | 432 | | | | | | | | |
| 72 | 79 | 424 | 656 | 488 | 530 | 496 | 472 | 360 | | | |
| 73 | 79 | 216 | 208 | 232 | 216 | 216 | 200 | 216 | 216 | 231 | 240 |
| 76 | 79 | 264 | 296 | 256 | 328 | 224 | 288 | 216 | | | |
| 77 | 79 | 312 | 536 | 416 | 568 | 336 | 344 | | | | |
| 78 | 79 | 432 | 648 | 376 | 352 | 296 | 328 | 528 | 552 | 760 | 560 |
| 79 | 79 | 96 | 88 | 96 | 72 | 81 | 96 | 88 | 96 | 96 | 128 |
| 80 | 79 | 240 | 240 | 1128 | 240 | 288 | 392 | | | | |
| 82 | 79 | 280 | 424 | 288 | 192 | 240 | 256 | 208 | 256 | 343 | 328 |
| 83 | 79 | 208 | 384 | 336 | 528 | 312 | 280 | 248 | 544 | | |
| 84 | 79 | 304 | 1071 | 440 | 712 | 256 | 536 | 560 | 344 | 208 | 264 |
| 86 | 79 | 400 | 376 | 656 | | | | | | | |
| 87 | 79 | 760 | | | | | | | | | |
| 89 | 79 | 192 | 256 | 240 | | | | | | | |
| 32 | 80 | 872 | 408 | 336 | 512 | 608 | 440 | 728 | 584 | 984 | 945 |
| 50 | 80 | 1384 | | | | | | | | | |
| 54 | 80 | 2175 | | | | | | | | | |
| 65 | 80 | 424 | 312 | | | | | | | | |
| 69 | 80 | 424 | 328 | | | | | | | | |
| 77 | 80 | 312 | 512 | 576 | | | | | | | |
| 78 | 80 | 632 | | | | | | | | | |
| 79 | 80 | 232 | 1096 | 680 | | | | | | | |
| 80 | 80 | 88 | 72 | 104 | 80 | 104 | 72 | 95 | 96 | 120 | 104 |
| 82 | 80 | 216 | 208 | | | | | | | | |
| 83 | 80 | 984 | 256 | 232 | 425 | 304 | | | | | |
| 85 | 80 | 488 | 512 | 576 | | | | | | | |
| 88 | 80 | 216 | | | | | | | | | |
| 89 | 80 | 264 | | | | | | | | | |
| 32 | 81 | 439 | 448 | | | | | | | | |
| 81 | 81 | 104 | 120 | | | | | | | | |
| 32 | 82 | 856 | 152 | 168 | 136 | 208 | 4032 | 176 | 192 | 704 | 216 |
| 65 | 82 | 407 | 192 | 256 | 160 | 240 | 191 | 184 | 200 | 152 | 192 |
| 66 | 82 | 408 | | | | | | | | | |
| 67 | 82 | 337 | | | | | | | | | |
| 68 | 82 | 1264 | | | | | | | | | |
| 69 | 82 | 24 | 240 | 280 | 176 | 112 | 248 | 152 | 264 | 168 | 240 |
| 70 | 82 | 472 | 464 | | | | | | | | |
| 71 | 82 | 280 | 305 | | | | | | | | |
| 73 | 82 | 280 | 200 | | | | | | | | |
| 79 | 82 | 240 | 656 | 249 | 360 | 264 | 672 | 352 | 240 | 329 | 312 |
| 80 | 82 | 416 | 280 | 360 | 328 | 280 | 336 | 352 | | | |
| 82 | 82 | 136 | 144 | 104 | 72 | 120 | 144 | 72 | 120 | 120 | 96 |
| 84 | 82 | 232 | 216 | | | | | | | | |
| 85 | 82 | 304 | 328 | 416 | 280 | 232 | 256 | 391 | 232 | 424 | |
| 189 | 82 | 304 | | | | | | | | | |
| 8 | 83 | 336 | 1184 | | | | | | | | |
| 32 | 83 | 192 | 360 | 232 | 888 | 424 | 256 | 184 | 1120 | 232 | 192 |
| 48 | 83 | 4088 | | | | | | | | | |
| 65 | 83 | 280 | 240 | 384 | 328 | 296 | 280 | 264 | | | |
| 66 | 83 | 288 | | | | | | | | | |
| 69 | 83 | 344 | 256 | 328 | 280 | 240 | 312 | 304 | 288 | 336 | 312 |
| 73 | 83 | 303 | 368 | 456 | 423 | 610 | 304 | 472 | 224 | 312 | 400 |
| 78 | 83 | 560 | 1992 | 424 | 336 | 360 | 1647 | 279 | 264 | | |

APPENDIX A-continued

Entries 395
Serial 1234

| First Key Press | Second Key Press | TS1 | TS2 | TS3 | TS4 | TS5 | TS6 | TS7 | TS8 | TS9 | TS10 |
|---|---|---|---|---|---|---|---|---|---|---|---|
| 79 | 83 | 254 | | | | | | | | | |
| 80 | 83 | 520 | | | | | | | | | |
| 82 | 83 | 400 | 352 | 176 | 183 | 192 | 216 | 256 | 1208 | 27558 | |
| 83 | 83 | 96 | 88 | 96 | 96 | 88 | 136 | 112 | 112 | 112 | 135 |
| 84 | 83 | 696 | 208 | 192 | 232 | 280 | 464 | 616 | | | |
| 85 | 83 | 448 | 360 | 232 | 320 | | | | | | |
| 89 | 83 | 256 | | | | | | | | | |
| 160 | 83 | 960 | 544 | | | | | | | | |
| 222 | 83 | 264 | 496 | 392 | | | | | | | |
| 32 | 84 | 1016 | 2160 | 1608 | 368 | 1032 | 376 | 232 | 1520 | 1360 | 2680 |
| 65 | 84 | 280 | 288 | 296 | 216 | 160 | 264 | 224 | 192 | 328 | 240 |
| 67 | 84 | 488 | 320 | | | | | | | | |
| 69 | 84 | 232 | 184 | 144 | 336 | 272 | 160 | 168 | 3696 | | |
| 72 | 84 | 288 | | | | | | | | | |
| 73 | 84 | 368 | 392 | 1624 | 744 | 1880 | 360 | 360 | 303 | 376 | 264 |
| 76 | 84 | 376 | | | | | | | | | |
| 78 | 84 | 352 | 432 | 288 | 384 | 512 | 400 | 312 | 320 | 184 | 256 |
| 79 | 84 | 544 | 232 | 288 | 1216 | 2880 | | | | | |
| 80 | 84 | 472 | 440 | | | | | | | | |
| 82 | 84 | 112 | | | | | | | | | |
| 83 | 84 | 232 | 88 | 224 | 168 | 120 | 112 | 184 | 120 | 216 | 128 |
| 84 | 84 | 88 | 112 | 88 | 104 | 88 | 96 | 160 | 112 | 80 | 88 |
| 85 | 84 | 320 | 264 | 296 | 336 | 376 | 376 | 232 | 328 | 272 | |
| 88 | 84 | 240 | | | | | | | | | |
| 160 | 84 | 280 | 1144 | 471 | 126 | 304 | 232 | 207 | 352 | 120 | 280 |
| 222 | 84 | 376 | | | | | | | | | |
| 32 | 85 | 472 | 288 | 352 | 360 | 424 | 328 | 1312 | 984 | | |
| 65 | 85 | 296 | 280 | | | | | | | | |
| 66 | 85 | 376 | 432 | 520 | 464 | | | | | | |
| 68 | 85 | 497 | 216 | 256 | 232 | | | | | | |
| 69 | 85 | 600 | | | | | | | | | |
| 70 | 85 | 287 | 264 | 224 | 312 | 240 | 176 | | | | |
| 71 | 85 | 520 | | | | | | | | | |
| 74 | 85 | 257 | | | | | | | | | |
| 77 | 85 | 328 | 568 | | | | | | | | |
| 79 | 85 | 264 | 264 | 304 | 344 | 288 | 359 | 265 | 464 | 288 | 288 |
| 80 | 85 | 1632 | 4200 | 416 | | | | | | | |
| 81 | 85 | 368 | 328 | | | | | | | | |
| 82 | 85 | 568 | 320 | | | | | | | | |
| 83 | 85 | 264 | 208 | 304 | | | | | | | |
| 84 | 85 | 320 | 280 | 544 | | | | | | | |
| 85 | 85 | 63 | 96 | 96 | 96 | 73 | 120 | 88 | 120 | 80 | 120 |
| 32 | 86 | 7847 | | | | | | | | | |
| 65 | 86 | 232 | 208 | 216 | 257 | | | | | | |
| 69 | 86 | 144 | 264 | | | | | | | | |
| 73 | 86 | 304 | 416 | 360 | 328 | 360 | 351 | | | | |
| 76 | 86 | 376 | 384 | 424 | | | | | | | |
| 78 | 86 | 288 | 288 | 328 | 352 | 288 | 352 | 296 | 352 | 328 | 344 |
| 79 | 86 | 544 | 392 | 392 | 416 | 400 | 368 | 368 | | | |
| 86 | 86 | 96 | 88 | 96 | 96 | 112 | 112 | 72 | 112 | 88 | 64 |
| 8 | 87 | 1968 | | | | | | | | | |
| 32 | 87 | 264 | 224 | 888 | 912 | 240 | 184 | 1024 | 368 | 1200 | |
| 69 | 87 | 488 | 520 | 496 | 520 | 512 | 272 | | | | |
| 79 | 87 | 400 | 400 | 304 | 760 | 392 | 473 | | | | |
| 82 | 87 | 320 | | | | | | | | | |
| 84 | 87 | 728 | | | | | | | | | |
| 87 | 87 | 96 | 64 | 88 | 72 | 72 | 95 | 80 | 120 | 136 | 144 |
| 160 | 87 | 208 | 240 | 512 | 208 | 209 | | | | | |
| 69 | 88 | 304 | 304 | | | | | | | | |
| 88 | 88 | 144 | 144 | | | | | | | | |
| 32 | 89 | 2264 | 840 | 3048 | 417 | 640 | 279 | | | | |
| 65 | 89 | 264 | 232 | 288 | 352 | 463 | | | | | |
| 69 | 89 | 496 | 288 | | | | | | | | |
| 71 | 89 | 280 | | | | | | | | | |
| 75 | 89 | 336 | 495 | | | | | | | | |
| 76 | 89 | 448 | 480 | 416 | 656 | 464 | 688 | 616 | 392 | 479 | |
| 78 | 89 | 416 | 312 | | | | | | | | |
| 82 | 89 | 512 | | | | | | | | | |
| 84 | 89 | 184 | 168 | 232 | | | | | | | |
| 85 | 89 | 320 | | | | | | | | | |
| 89 | 89 | 96 | 112 | 112 | 96 | 96 | 88 | 48 | 72 | 95 | 112 |
| 160 | 89 | 208 | 647 | | | | | | | | |
| 8 | 160 | 1096 | 248 | 312 | | | | | | | |
| 13 | 160 | 2192 | 57557 | 7586 | 1887 | 2136 | 18415 | 6183 | 68748 | 18455 | 2095 |

APPENDIX A-continued

Entries 395
Serial 1234

| First Key Press | Second Key Press | TS1 | TS2 | TS3 | TS4 | TS5 | TS6 | TS7 | TS8 | TS9 | TS10 |
|---|---|---|---|---|---|---|---|---|---|---|---|
| 32 | 160 | 240 | 864 | 3096 | 200 | 328 | 1192 | 208 | 448 | 288 | 632 |
| 37 | 160 | 7224 | | | | | | | | | |
| 49 | 160 | 919 | | | | | | | | | |
| 50 | 160 | 1120 | | | | | | | | | |
| 84 | 160 | 3760 | | | | | | | | | |
| 89 | 160 | 1048 | 4512 | | | | | | | | |
| 160 | 160 | 376 | 392 | 424 | 368 | 384 | 304 | 360 | 288 | 480 | 288 |
| 160 | 186 | 232 | 320 | 1080 | 208 | | | | | | |
| 186 | 186 | 88 | 104 | 80 | 96 | | | | | | |
| 84 | 187 | 840 | | | | | | | | | |
| 187 | 187 | 152 | | | | | | | | | |
| 65 | 188 | 4112 | | | | | | | | | |
| 69 | 188 | 4567 | | | | | | | | | |
| 71 | 188 | 4496 | | | | | | | | | |
| 72 | 188 | 4720 | | | | | | | | | |
| 78 | 188 | 2888 | | | | | | | | | |
| 82 | 188 | 4272 | | | | | | | | | |
| 83 | 188 | 3016 | 648 | 2528 | 6096 | | | | | | |
| 89 | 188 | 4760 | | | | | | | | | |
| 188 | 188 | 72 | 80 | 72 | 72 | 72 | 32 | 72 | 72 | 64 | 80 |
| 32 | 189 | 497 | 1416 | | | | | | | | |
| 69 | 189 | 1072 | | | | | | | | | |
| 87 | 189 | 560 | | | | | | | | | |
| 189 | 189 | 88 | 96 | 95 | 88 | | | | | | |
| 8 | 190 | 777 | | | | | | | | | |
| 65 | 190 | 1280 | | | | | | | | | |
| 69 | 190 | 2632 | | | | | | | | | |
| 70 | 190 | 3512 | | | | | | | | | |
| 71 | 190 | 18647 | | | | | | | | | |
| 75 | 190 | 4576 | | | | | | | | | |
| 78 | 190 | 3824 | 3375 | 18175 | | | | | | | |
| 82 | 190 | 3096 | | | | | | | | | |
| 83 | 190 | 9464 | 1832 | 3144 | 2352 | 1088 | | | | | |
| 84 | 190 | 3032 | 58061 | | | | | | | | |
| 89 | 190 | 3391 | | | | | | | | | |
| 190 | 190 | 96 | 64 | 71 | 64 | 72 | 72 | 72 | 64 | 80 | 96 |
| 160 | 191 | 839 | | | | | | | | | |
| 191 | 191 | 88 | | | | | | | | | |
| 78 | 222 | 632 | 608 | | | | | | | | |
| 84 | 222 | 5655 | 792 | | | | | | | | |
| 222 | 222 | 104 | 104 | 72 | 88 | | | | | | |

The invention claimed is:

1. A method for authenticating a user using keyboard typing cadence, comprising:
capturing a plurality of pieces of key event data, wherein each piece of key event data includes one or more timing measurements having a millisecond or greater level of precision;
determining typing cadence data for a keyboard used by a person on an ongoing basis during a natural behavior typing activity, the typing cadence data including the plurality of pieces of key event data generated during the natural behavior typing activity, the one or more timing measurements included in each piece of key event data comprising an elapsed time between when a key is pressed and the same key is released during typing and an elapsed time between when a first key is pressed and a second different key is pressed during typing;
receiving the typing cadence data at regular intervals during the natural behavior typing activity;
continuously authenticating, by a computer executing an authentication piece of software, an identity of the person by analyzing the typing cadence data for the person, wherein continuously authenticating the identity of the person further comprises comparing the received typing cadence data to a stored set of typing cadence data for the person; and
generating an assessment about the authenticity of the person by analyzing the typing cadence data using a t-test that compares a distribution of the typing cadence data to a distribution of the previously stored set of typing cadence data for the person.

2. The method of claim 1, wherein determining typing cadence data further comprising determining the typing cadence data from a remote typing cadence component and wherein authenticating the person further comprising authenticating the person at a backend component remote from the typing cadence component.

3. The method of claim 1, wherein analyzing the typing cadence data further comprises comparing the typing cadence data for the person to previously stored typing cadence data for the person.

4. The method of claim 1, wherein the keyboard further comprises a plurality of keys.

5. The method of claim 4, wherein the keyboard is one of a keypad, a physical keyboard, a virtual keyboard and a keyboard displayed on a touchscreen.

6. The method of claim 1 further comprising capturing, by a typing cadence component, the typical cadence data for a user.

7. A system for authenticating a user using keyboard typing cadence, comprising:
- a typing cadence piece of hardware that captures a plurality of pieces of key event data, wherein each piece of key event data includes one or more timing measurements having a millisecond or greater level of precision and determines typing cadence data for a keyboard used by a person on an ongoing basis during a natural behavior typing activity, the one or more timing measurements included in each piece of key event data comprising an elapsed time between when a key is pressed and the same key is released during typing and an elapsed time between when a first key is pressed and a second different key is pressed during typing; and
- a backend component that receives the typing cadence data at regular intervals during the natural behavior typing activity and continuously authenticates an identity of the person by analyzing the typing cadence data for the person, wherein continuously authenticating the identity of the person further comprises comparing the received typing cadence data to a stored set of typing cadence data for the person, wherein the backend component generates an assessment about the authenticity of the person by analyzing the typing cadence data using a t-test that compares a distribution of the typing cadence data to a distribution of the previously stored set of typing cadence data for the person.

8. The system of claim 7, wherein the typing cadence piece of hardware is remote from the backend component.

9. The system of claim 7, wherein the backend component compares the typing cadence data for the person to previously stored typing cadence data for the person.

10. The system of claim 7, wherein the keyboard further comprises a plurality of keys.

11. The system of claim 10, wherein the keyboard is one of a keypad, a physical keyboard, a virtual keyboard and a keyboard displayed on a touchscreen.

12. The system of claim 7, wherein the typing cadence piece of hardware is integrated into a keyboard.

13. A method for authenticating a user using keyboard typing cadence, comprising:
- capturing a plurality of pieces of key event data, wherein each piece of key event data includes one or more timing measurements having a millisecond or greater level of precision and a clock stamp;
- determining for each piece of key event data, based on the clock stamp an elapsed time between when a key is pressed and the same key is released during typing and an elapsed time between when a first key is pressed and a second different key is pressed during typing;
- determining typing cadence data for a keyboard used by a person on an ongoing basis during a natural behavior typing activity, wherein the typing cadence data is determined based on the plurality of pieces of key event data;
- receiving, by a computer executing an authentication piece of software, the typing cadence data at regular intervals during the natural behavior typing activity; and
- continuously authenticating, by the computer executing the authentication piece of software, an identity of the person the natural behavior typing activity performed on the keyboard, wherein continuously authenticating the identity of the person further comprises comparing the received typing cadence data to a stored set of typing cadence data for the person and
- generating an assessment about the authenticity of the person by analyzing the typing cadence data using a t-test that compares a distribution of the typing cadence data to a distribution of the previously stored set of typing cadence data for the person.

* * * * *